(12) United States Patent
Mulvenna et al.

(10) Patent No.: US 6,691,749 B2
(45) Date of Patent: Feb. 17, 2004

(54) SERVICE COUPLING

(75) Inventors: Alan John Mulvenna, North Vancouver (CA); John David Trevor Graham, Vancouver (CA)

(73) Assignee: General Hydrogen Corporation, Seattle, WA (US)

( * ) Notice: Subject to any disclaimer, the term of this patent is extended or adjusted under 35 U.S.C. 154(b) by 0 days.

(21) Appl. No.: 10/158,389

(22) Filed: May 29, 2002

(65) Prior Publication Data

US 2003/0127153 A1 Jul. 10, 2003

Related U.S. Application Data

(60) Provisional application No. 60/347,585, filed on Jan. 10, 2002.

(51) Int. Cl.[7] .................................................. B67D 5/00
(52) U.S. Cl. ............................ 141/231; 141/94; 141/98; 191/4
(58) Field of Search ........................... 141/94, 98, 231; 191/4

(56) References Cited

U.S. PATENT DOCUMENTS

| | | | |
|---|---|---|---|
| 3,678,972 A | 7/1972 | Swindler | 141/387 |
| 3,742,421 A | 6/1973 | Van Rooijen | 338/180 |
| 3,893,480 A | 7/1975 | Dunbar | 137/615 |
| 4,158,802 A | 6/1979 | Rose, II | 320/2 |
| 4,242,017 A | 12/1980 | De Fazio | 408/111 |
| 4,881,581 A | 11/1989 | Hollerback | 141/113 |
| 4,919,174 A | 4/1990 | Warland | 141/384 |
| 5,134,541 A | 7/1992 | Frouin | 361/334 |
| 5,272,431 A | 12/1993 | Nee | 320/2 |
| 5,306,999 A | 4/1994 | Hoffman | 320/2 |
| 5,327,066 A | 7/1994 | Smith | 320/2 |
| 5,344,330 A | 9/1994 | Hoffman | 439/138 |
| 5,352,122 A | 10/1994 | Speyer et al. | 439/113 |
| 5,498,163 A | 3/1996 | Takamura et al. | 439/13 |
| 5,507,326 A * | 4/1996 | Cadman et al. | 141/198 |
| 5,562,467 A | 10/1996 | Davis, II et al. | 439/188 |
| 5,642,270 A | 6/1997 | Green et al. | 363/21 |
| 5,671,786 A | 9/1997 | Corfitsen | 141/94 |
| 5,703,461 A | 12/1997 | Minoshima et al. | 320/2 |
| 5,738,459 A | 4/1998 | Smith | 401/190 |
| 5,742,229 A | 4/1998 | Smith | 340/438 |
| 5,758,414 A | 6/1998 | Ehrenfels | 29/857 |
| 5,767,584 A | 6/1998 | Gore et al. | 290/1 R |
| 5,821,731 A | 10/1998 | Kuki et al. | 320/108 |
| 5,850,135 A | 12/1998 | Kuki et al. | 320/108 |
| 5,858,568 A | 1/1999 | Hsu et al. | 429/13 |
| 5,862,222 A | 1/1999 | Gunnarsson | 380/24 |
| 6,107,691 A | 8/2000 | Gore et al. | 290/1 R |
| 6,116,298 A | 9/2000 | Haimovich et al. | 141/94 |
| 6,157,162 A | 12/2000 | Hayashi et al. | 320/104 |
| 6,200,157 B1 | 3/2001 | Ams et al. | 439/409 |
| 6,202,710 B1 | 3/2001 | Dill et al. | 141/94 |
| 6,347,785 B1 | 2/2002 | Copp et al. | 251/149.6 |
| 6,439,275 B1 | 8/2002 | Alhomsi | 141/94 |

FOREIGN PATENT DOCUMENTS

| | | |
|---|---|---|
| DE | 42 13 159 A1 | 10/1993 |
| EP | 0 433 116 B1 | 9/1994 |
| GB | 2 352 886 A | 2/2001 |
| WO | WO 94/18723 | 8/1994 |
| WO | WO 98/12763 | 3/1998 |
| WO | WO 01/04984 | 1/2001 |
| WO | WO 01/28017 | 4/2001 |

* cited by examiner

*Primary Examiner*—J. Casimer Jacyna
(74) *Attorney, Agent, or Firm*—Dorsey & Whitney LLP

(57) ABSTRACT

This invention relates to a service coupling for coupling a vehicle to a service port such that one or more services are transferable therebetween. The coupling comprises a plug comprising at least one service engagement portion; and a receptacle comprising an opening to receive the plug, and at least one service engagement portion positioned to engage the plug service engagement portion when the plug is inserted into the receptacle. The engagement is such that a service is transferable between the plug and receptacle. At least one of the plug and receptacle service engagement portions is arcuate thereby enabling engagement to be maintained between the plug and receptacle engagement portions when the plug is rotated about the axis and within the arc-length of the arcuate engagement portion.

31 Claims, 15 Drawing Sheets

Ffigure 13

SERVICE COUPLING

RELATED APPLICATIONS

This application claims priority from U.S. provisional Patent Application No. 60/347,585 "Method and System For Bi-Directional Conveyance of Electricity, Data, Liquids and Gases Between Vehicles and Stationary Service Ports" to Graham et al., filed on Jan. 10, 2002.

This application further references US patent application "Service Coupling Configuration" to Mulvenna et al., and U.S. patent application "Connectivity Device" to Mulvenna et al., filed concurrently with this application.

FIELD OF THE INVENTION

This invention relates generally to couplings, and in particular to couplings that enable the transfer of a service such as electricity, fluids or data between a vehicle and a service port.

BACKGROUND OF THE INVENTION

In today's world, motor vehicles such as automobiles, trucks, and motorcycles are typically powered by internal combustion engines. In these vehicles, a liquid fossil fuel such as gasoline is ignited to transform the chemical energy in the fuel into mechanical energy that is used to drive the vehicle. Due to the scarcity of fossil fuels and the pollution from vehicles burning these fuels, alternative fuels and new vehicles powered by these alternative fuels are being developed. For example, new types of vehicles that utilize gaseous fuels are being developed and are expected to enter commercial production within the next decade.

One type of gaseous fuel powered vehicle is a fuel cell vehicle (FCV), which uses a fuel cell to electrochemically generate electricity from hydrogen fuel and uses the electricity to power the vehicle. FCVs may use pure hydrogen delivered directly from a hydrogen fueling station, or may extract hydrogen from a hydrogen-containing fuel. In the latter case, a service terminal may for example, transmit a hydrogen-containing liquid such as methanol to the FCV, for reforming into hydrogen by an on-board methanol reformer. As another example, the FCV may have an on-board electrolyzer that uses electrolysis to extract hydrogen from water molecules supplied to the vehicle by the service terminal.

Because the FCV has different servicing requirements than gasoline-powered vehicles and because no FCV has yet to enter full-scale commercial production, no FCV servicing system is known to exist. Such an FCV servicing system would require service terminals that are configured to service FCVs; for example, an FCV service terminal may have a service port that connects to an FCV and facilitates the exchange of fuel, electricity and possibly data between the FCV and the service port. Providing such an FCV service terminal presents many challenges, including providing cost-effective and efficient systems for connecting the FCV to the service port.

SUMMARY OF THE INVENTION

According to one aspect of the invention, there is provided a service coupling for coupling a vehicle to a service port such that one or more services are transferable therebetween. The service coupling includes a plug and a receptacle. The plug includes a distal end, a proximal end, a pair of opposed major surfaces extending between the distal and proximal ends, and a service engagement portion on at least one of the major surfaces. The receptacle includes an opening shaped to receive the plug inserted distal-end first, and a service engagement portion inside the receptacle and corresponding with each plug service engagement portion. One of the plug and receptacle service engagement portions is substantially arcuate and the other engagement portion is configured to engage at least some portion of the arcuate engagement portion along the arc-length of the arcuate engagement portion, thereby enabling engagement to be maintained between the plug and receptacle engagement portions when the plug is in a rotational position about the arc-axis of the arcuate engagement portion and that is not perfectly aligned with the receptacle.

At least one plug service engagement portion and at least one receptacle service engagement portion may be electricity exchange interfaces comprising electrical and ground contacts. In such case, the plug electrical contact may be substantially arcuate. In particular, the plug may include a plurality of arcuate electrical contacts all having a common arc-axis. The plug ground contact may be located on the arc-axis. A receptacle electrical contact may be provided for each plug contact; such receptacle electrical contact is a butt-face contact positioned to engage a corresponding plug contact when the plug and receptacle are coupled.

The plug and receptacle service engagement portions may be fluid exchange interfaces and one of the fluid exchange interfaces may include an open-faced arcuate fluid channel and a fluid valve in the channel. In such case, the plug fluid exchange interface may be an arcuate fluid channel with a fluid valve set in the floor of the channel. The receptacle fluid exchange interface may be arcuate land corresponding to the plug fluid channel, with a fluid valve set in the raised surface portion of the land.

The plug fluid channel may be annular. In such case, the receptacle fluid exchange interface may be an annular land corresponding to the plug fluid channel, with a fluid valve set in the raised surface portion of the land.

The exchange fluid may be water or hydrogen gas, or both.

The plug may include a pair of opposed top and bottom major surfaces extending between distal and proximal ends of the plug, and the fluid exchange interface may be on one major surface. The plug may have both electricity and fluid exchange interfaces; the plug electricity exchange interface may be on the plug top major surface and the plug fluid exchange interface may be on the plug bottom major surface.

DETAILED DESCRIPTION OF DRAWINGS

FIG. 13 is a proximal end elevation view of the plug.

DETAILED DESCRIPTION

Figure 1:
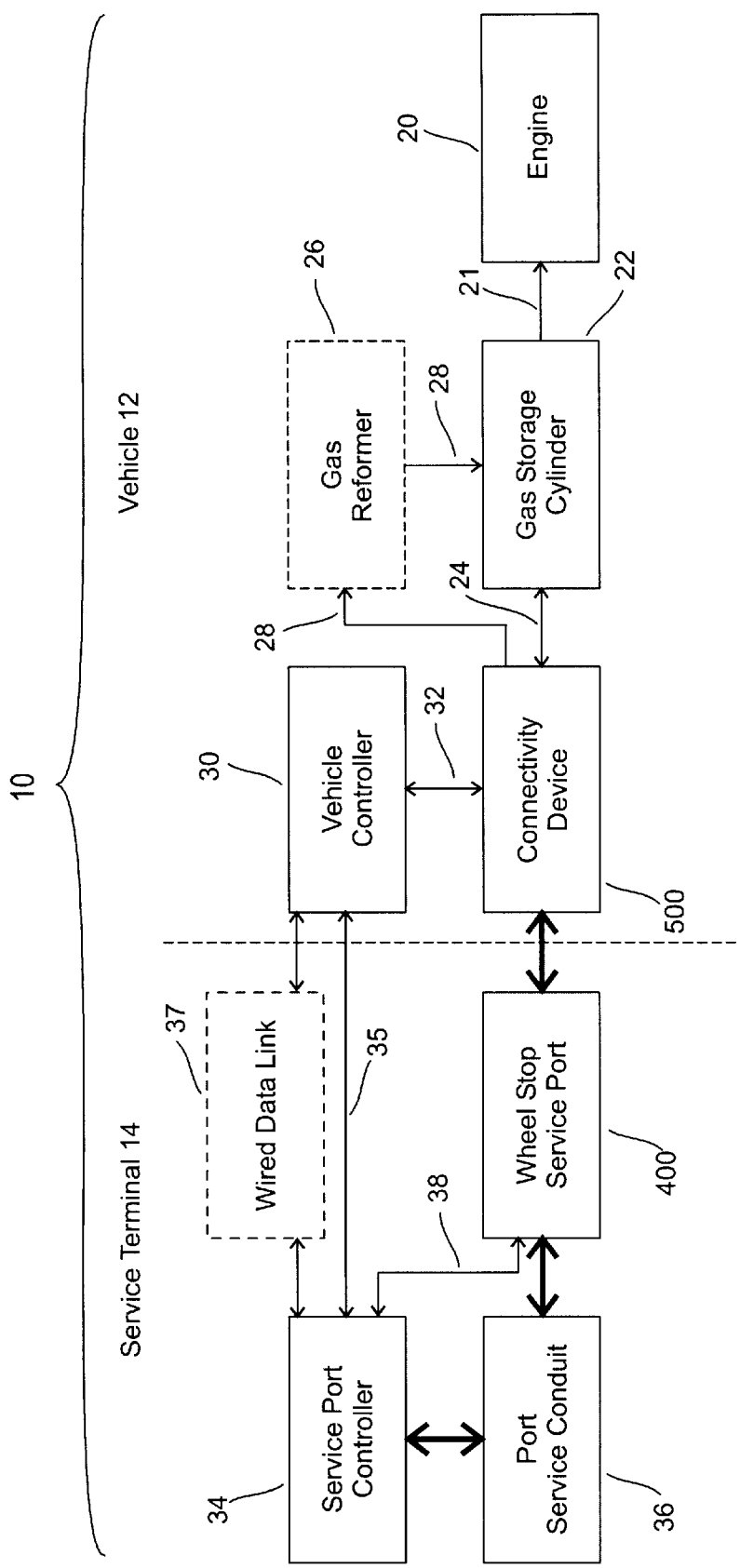
FIG. 1 is a system block diagram of a service terminal and a terminal-compatible vehicle, wherein a gaseous fuel and data are exchangeable between the terminal and vehicle.

FIGS. 1–5 illustrate different embodiments of a system 10 for transferring one or more of energy, material or data (collectivity referred to as "services") between system-compatible vehicles 12 and a stationary service terminal 14. The service terminal 14 may be integrated into a building or pre-existing structure, or be part of a dedicated vehicle service terminal building. In each embodiment, the service terminal 14 has a wheel stop service port 400 and the vehicle 12 has a connectivity device 500 that can couple to the wheel stop service port 400. Other major components of the service terminal 14 include a service port controller 34 for controlling the transfer of services by the wheel stop service port 400, and a port service conduit 36 for coupling the service terminal 14 to one or more service destinations (not shown). The destination may be a service source when the service is to be transferred from the source to the vehicle 12; for example, the service source may be a fuel tank that supplies fuel to the vehicle 12 when coupled to the service terminal 14. Or, the destination may be a service consumer when the service is to be transferred from the vehicle 12 to the consumer; for example, the service terminal 14 may be connected to a power grid, and the consumer may be an electricity user connected to the grid that receives electricity generated by a fuel cell onboard the vehicle 12 and transferred to the grid when the vehicle 12 is connected to the service terminal 14.

The system 10 is particularly suitable for providing services to fuel cell and regenerative fuel cell vehicles, but can also serve vehicles powered by other means, such as natural gas, electricity, etc. The vehicle 12 has a number of components that make it compatible with the service terminal; the type of components depend on what services are being transferred.

FIG. 1 illustrates a system 10 that transfers gaseous fuel between the vehicle 12 and the service terminal 14. The gaseous fuel may be hydrogen. The vehicle 12 is suitably any known vehicle that can operate on gaseous fuels, such as fuel cell vehicles (FCV), regenerative fuel cell vehicles (RFCV), and internal combustion engine vehicles (ICEV). The vehicle 12 includes a gaseous fuel compatible engine, 20, and a gas storage cylinder 22 fluidly connected to the engine 20 and the connectivity device 500 by a gas line 24. The connectivity device 500 has a gas transfer port (not shown) that is sealably connectable to a gas transfer port (not shown) of the wheel stop service port 400 to enable the transfer of gas between the vehicle 12 and the service terminal 14. Optionally, a gas reformer 26 is provided that is connected to the connectivity device 500 and the gas storage cylinder 22 via another gas line 28, so that gaseous fuel transmitted from the wheel stop service port 400 can be first reformed before being stored in the gas storage cylinder 22 and used by the engine 20. Gas line 24 is bi-directional to enable fuel to be transmitted from the service terminal 14 to the vehicle 12, or vice versa.

The connectivity device 500 is electrically communicative with a vehicle controller 30 via control signal wire 32, which controls operation of the connectivity device 500; for example, the vehicle controller 30 provides automatic connection and gas transfer control signals to control the transfer of gaseous fuel through the connectivity device 500. The vehicle controller 30 has a transceiver (not shown) to exchange data wirelessly with a transceiver (not shown) in a service port controller 34 of the service terminal 14 (wireless link shown as 35). The construction of the controllers 30, 34 are known in the art. Optionally, a, wired data link 37 may be substituted for the transceivers; in such case, data line connection points (not shown) are provided on each of the wheel stop service port 400 and the connectivity device 500 that connect when the wheel stop service port 400 and the connectivity device 500 are coupled or alternatively data can be sent over the electrical power connections. The data communicated to and from the vehicle controller 30 relates to providing data-related services that include vehicle identification, and fueling processes.

The port service conduit 36 is fluidly connected to the wheel stop service port 400 and an off-vehicle fuel source/destination, and is electrically connected to the wheel stop service port 400 and the service port controller 34. Optionally, a control signal wire 38 may be provided to link the service port controller 34 directly to the wheel stop service port 400 and enable direct communication between the two components. The port service conduit 36 may be fluidly connected to storage tanks (not shown) of the service terminal 14 that may be supplied fuel from time to time by refueling tankers (not shown), or to a fluid pipeline (not shown) in a gas distribution network (not shown) for the continuous supply of fuel.

Figure 2:
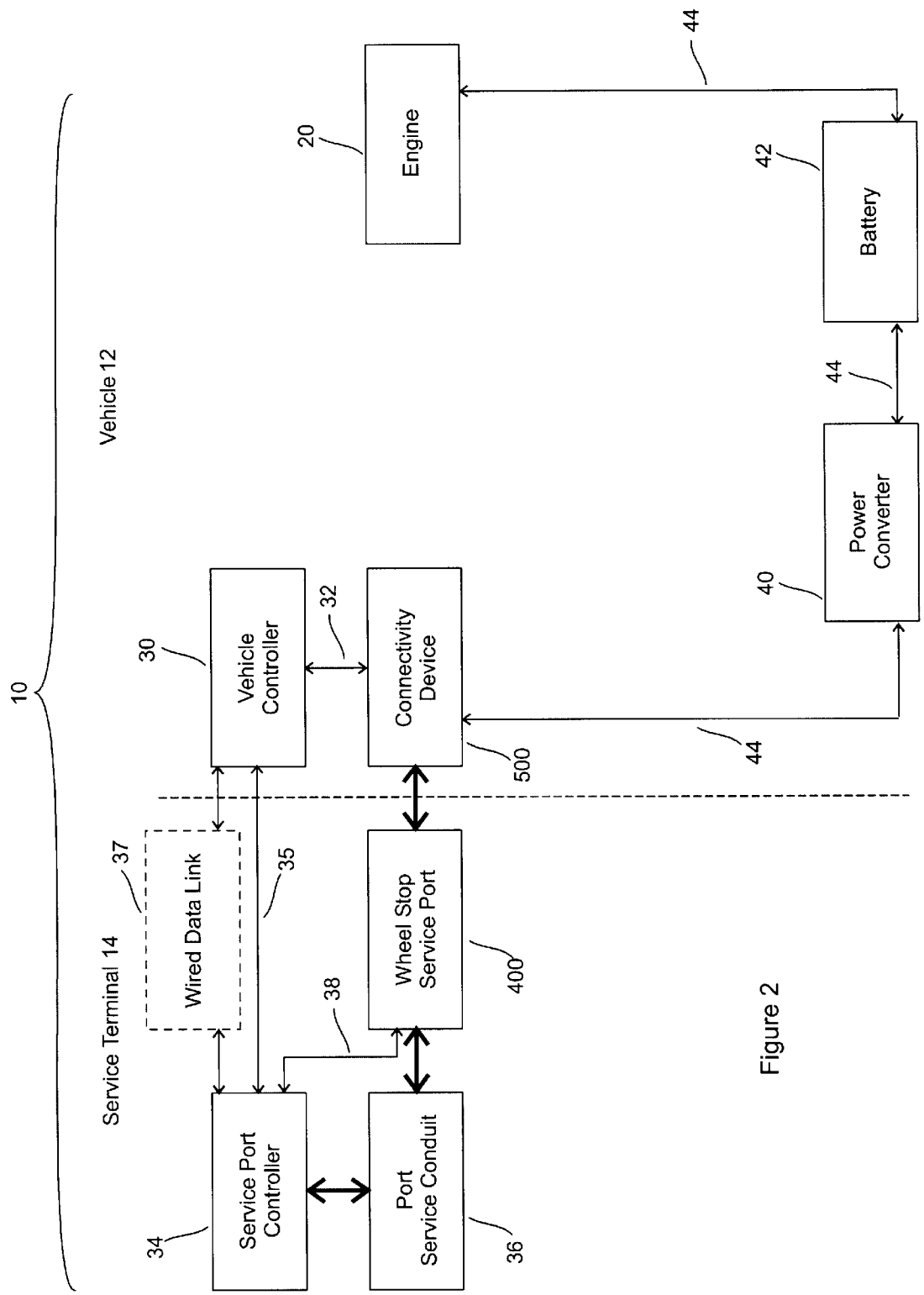
FIG. 2 is a system block diagram of a service terminal and a terminal-compatible vehicle, wherein electricity and data are exchangeable between the terminal and vehicle.

FIG. 2 illustrates a system 10 that transfers electrical energy between the vehicle 12 and the service terminal 14, wherein the vehicle 12 is a battery-powered electric vehicle (BPEV). The vehicle 12 therefore differs from the vehicle shown in FIG. 1 in that a power converter 40, battery 42 and electrical cables 44 replace the gas storage cylinder 22 and gas lines 24. Furthermore, the engine 20 is an electric motor, and the connectivity device 500 is configured to transmit electric power between the service terminal 14 and the vehicle 12, and the vehicle controller 30 is configured to control the transmission of electrical energy by the connectivity device 500. Electrical cables 44 electrically couple the connectivity device 500, power converter 40, battery 42, and the; engine 20. Similarly, the wheel stop service port 400 is configured to transmit electric power between the service terminal 14 and the vehicle 12, and the service port controller 34 is configured to control the transmission of energy by the wheel stop service port 400.

Figure 3:
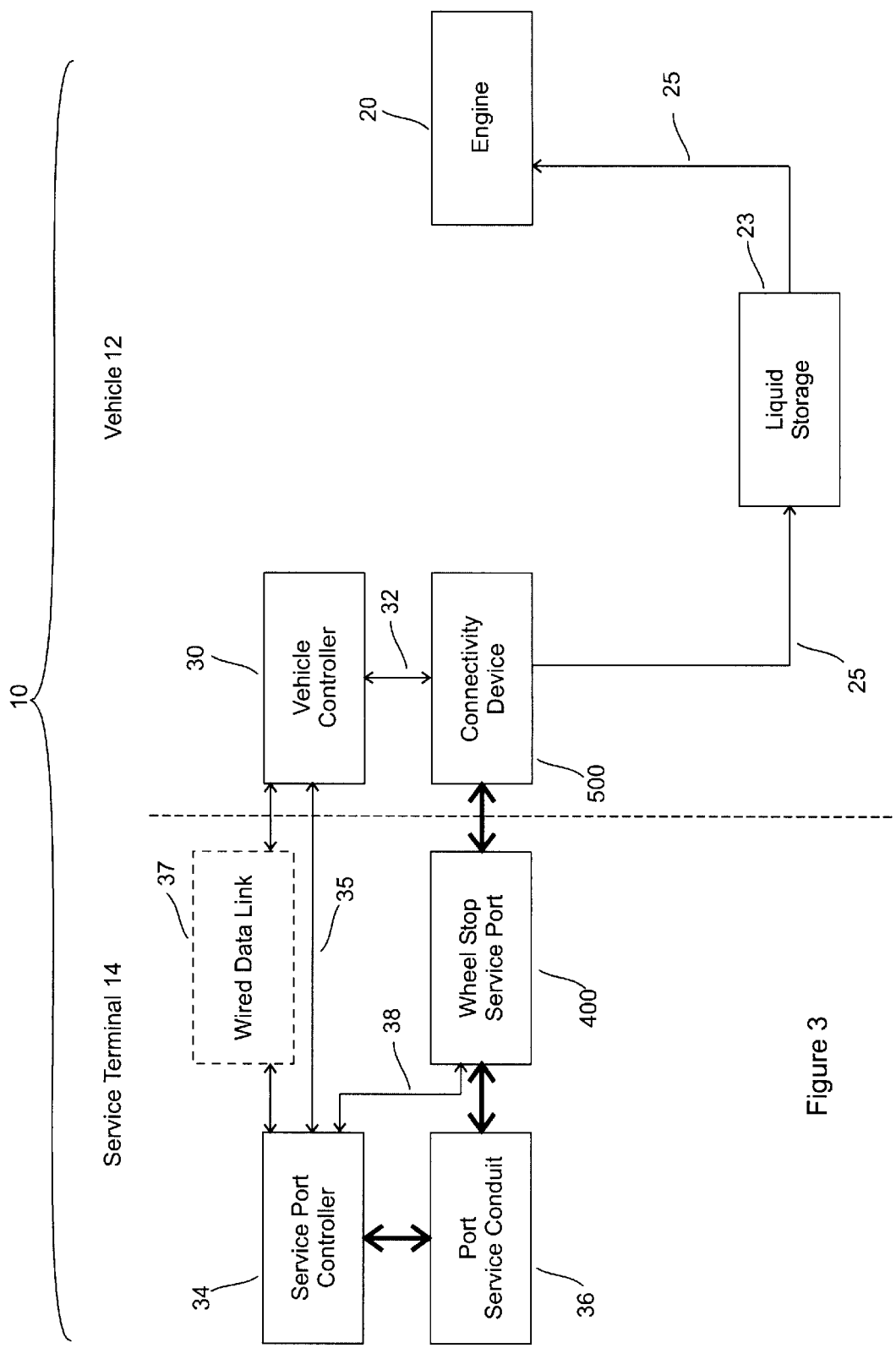
FIG. 3 is a system block diagram[ ]of a service terminal and a terminal-compatible vehicle, wherein liquid fuel and data are exchangeable between the terminal and vehicle.

FIG. 3 illustrates a system 10 that transfers liquid fuel between the service terminal 14 and the vehicle 12. The liquid fuel may be fuel that is directly combustible by a conventional internal combustion engine, or be reformed into hydrogen reformate for use by a fuel cell. The vehicle 12 therefore differs from the vehicle shown in FIG. 1 in that a liquid fuel storage tank 23 and liquid fuel lines 25 are designed to store and transmit liquid fuel as known in the art. Furthermore, the engine 20 is an internal combustion engine if the fuel is to be directly combusted, or a fuel cell if the fuel is reformate (in such case, a reformer (not shown) is provided to reform the fuel into hydrogen reformate and reaction products, and a scrubber is provided (not shown) to clean the fuel sufficiently for use by the fuel cell) and the connectivity device 500 is configured to transfer liquid fuel between the service terminal 14 and the vehicle 12, and the vehicle controller 30 is configured to control the transmission of liquid by the connectivity device 500. Similarly, the wheel stop service port 400 is configured to transmit liquid fuel between the service terminal 14 and the vehicle 12, and the service port controller 34 is configured to control the transmission of liquid fuel by the wheel stop service port 400.

Figure 4:
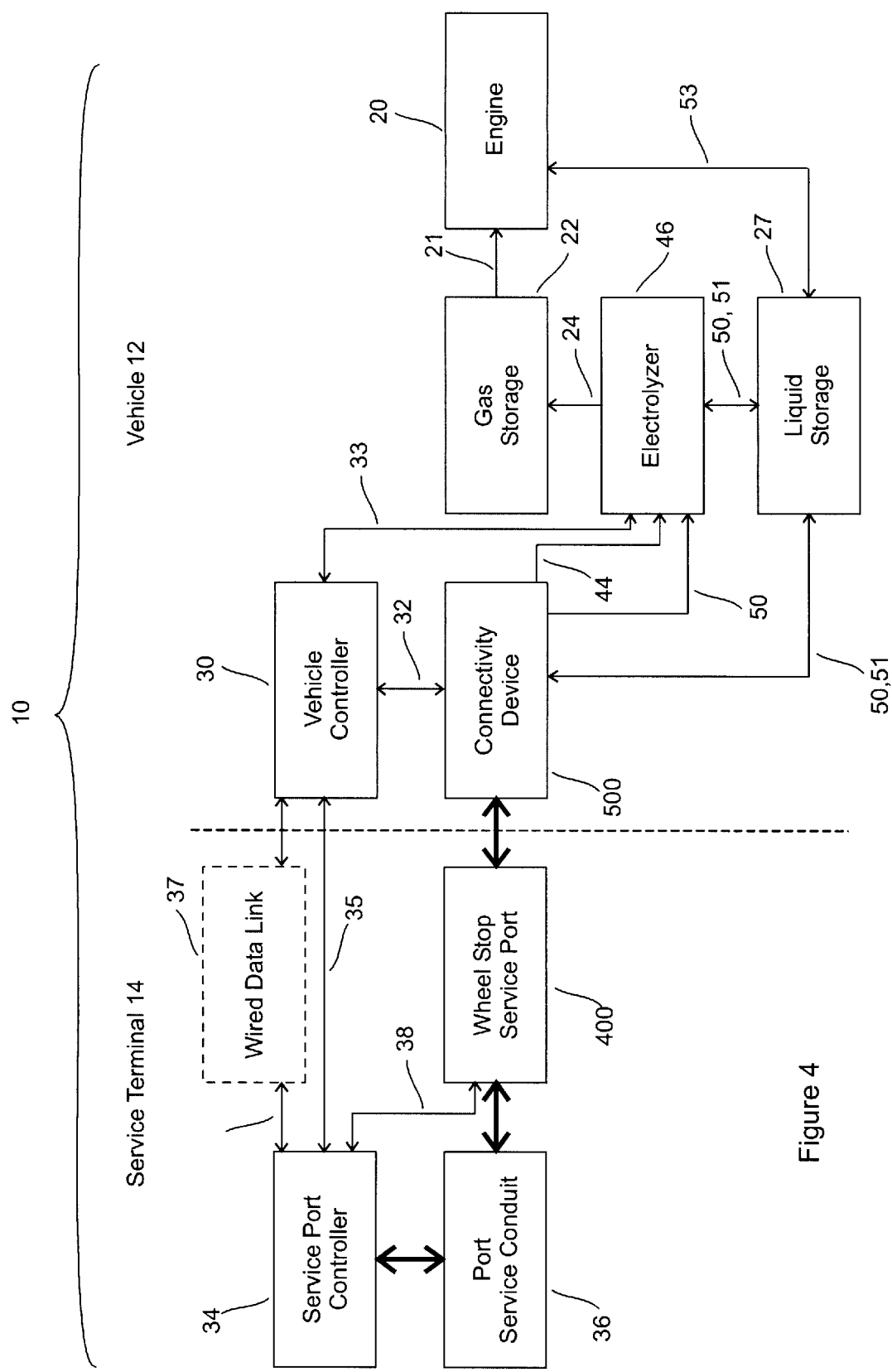
FIG. 4 is a system block diagram of a service terminal and a terminal-compatible vehicle, wherein water, electricity and data are exchangeable between the terminal and vehicle.

FIG. 4 illustrates a system 10 that transfers water and electrical energy between the service terminal 14 and the vehicle 12. The water is electrolyzed on-board the vehicle 12 to generate hydrogen fuel. The vehicle 12 therefore differs from the vehicle shown in FIG. 1 in that a liquid storage tank 27 is provided to store water transferred from the service terminal 14, an electrolyzer 46 is provided to electrolyze the water to produce hydrogen gas, and a gas storage cylinder 22 is provided to store the hydrogen gas for use by the engine 20. Hydrogen fuel lines 21 fluidly connect the gas storage cylinder 22 to the electrolyzer 46 and engine 20 respectively, and fluid supply and return lines 50, 51 fluidly connect the fluid storage tank 27 to the connectivity device 500 and the electrolyzer 46 respectively. Water is supplied to the vehicle 12 as hydrogen feedstock for the electrolyzer 46 via liquid supply line 50, and unused water from the electrolyzer 46 is returned through liquid return line 51. Water line 53 connects the liquid storage tank 27 to the engine 20 to return product water from the engine 20 and to supply water to humidify the gas stream. Both the connectivity device 500 and the wheel stop service port 400 are configured to transfer liquid and electricity between the service terminal 14 and the vehicle 12. Electrical cables 44 electrically connect the connectivity device 500 to the electrolyzer 46. The vehicle controller 30 is configured to control the operation of the connectivity device 500 to transfer water and electricity for the operation of the electrolyzer 46. The vehicle controller 30 is electrically communicative with the connectivity device 500 via control signal wire 32 and with the electrolyzer 46 via electrical connector 33. The service port controller 34 is configured to control the operation of the wheel stop service port 400 to transfer water and electricity. The service port controller 34 is electrically communicative with the wheel stop service port 400 via the port service conduit 36. Optionally, the controller 34 may include control signal wires 38 connected directly to the wheel stop service port 400 to provide liquid and electricity transfer control signals to control the transfer of liquids and electricity through the wheel stop service port 400.

In operation, water is transferred to the vehicle 12 through the wheel stop service port 400 and through the coupled connectivity device 500 and then stored in the liquid storage tank 27. The water is then transferred to the electrolyzer 46 and transformed to gaseous hydrogen by-product which is transferred to gas storage cylinders 22 through gas line 24. Electricity is transferred through the wheel stop service port 400 and the connectivity device 500 and to the electrolyzer 46 to power the electrolysis process. Alternatively, water is transferred to the vehicle 12 through the wheel stop service port 400 and through the coupled connectivity device 500 directly to the electrolyzer 46.

Figure 5:
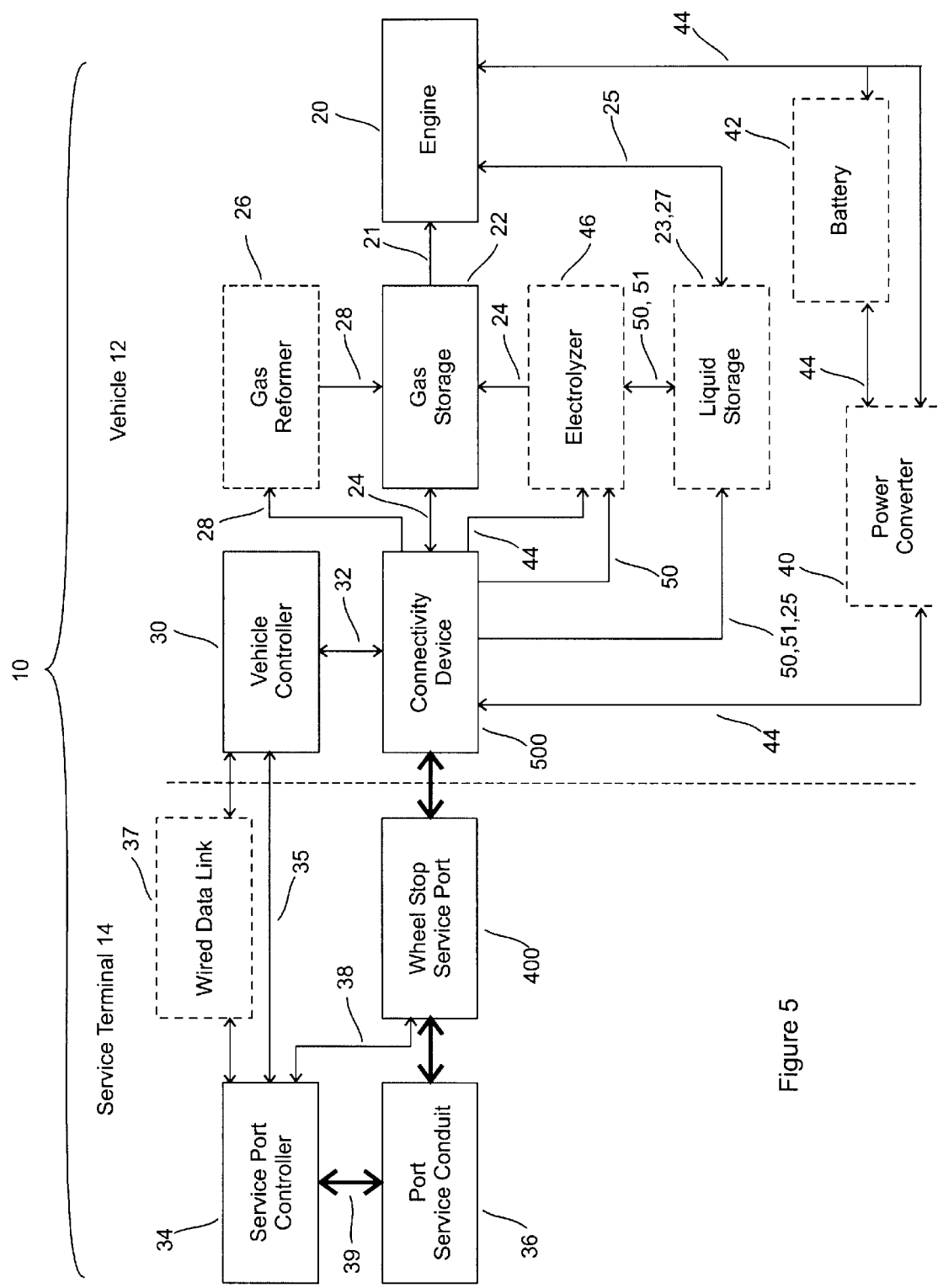
FIG. 5 is a system block diagram of a service terminal and a terminal-compatible vehicle, wherein liquid and gaseous fuels, water, electricity and data are exchangeable between the terminal and vehicle.

FIG. 5 illustrates a system 10 that is capable of transferring one or more of gaseous and liquid fuel, electrical energy and data between the service terminal 14 and the vehicle 12. The vehicle 12 may include some or all of the components as described in the systems illustrated in FIGS. 1 to 4. The connectivity device 500 may include one or a combination of the service connections as described in the previous systems. For this embodiment, the wheel stop service port 400 has interfaces for at least gaseous fuel, liquid, electricity and data. The wheel stop service port 400 is suitable to work with the connectivity device 500 of any of the vehicles described in FIGS. 1 to 4, regardless of the maximum number of service connections on the connectivity device 500. An additional function of the system 10 is that the type of connectivity device 500 and the type of service required is determined by communication between the vehicle controller 30 and the service port controller 34. The service port controller 34 provides control signals through the control signal wire 38 to the wheel stop service port 400 directly, or via control signal wire 39 and port service conduit 36 to control the transfer of only those services suitable for the identified connectivity device 500.

Additional features may be incorporated into any of the service terminals 14 that utilize water flow, such as an integrated pressure relief valve (not shown) and/or flow limiting device (not shown) connected in-line to the fluid lines 50 for the purpose of restricting fluid flow. These components reduce the risk and scale of problems caused by fluid delivery component (not shown) failures by restricting or redirecting fluid flow, as would be understood by one skilled in the art.

Water quality control features may be incorporated into any of the service terminals 14 that utilize water flow, such as an integrated filter (not shown) connected of the fluid lines 50 for the purpose of treatment to remove contaminants (particulates, etc.) and/or to de-ionize the water. The treatment of the delivered water maintains the cleanliness of the connection bay 406, the connectivity device 500 and enhances the operation of the electrolyzer 46 and fuel cells.

An optional method of connecting the fluid line 50 from the wheel stop service port 400 to the connectivity device 500 of the system 10 of FIGS. 4 and 5 is to include a self-sealing permeable or semi-permeable membrane (not shown) in the water flow path for water transfer. The advantage of this feature is to provide self-sealing and water filtering when the connection is made.

Figure 6:
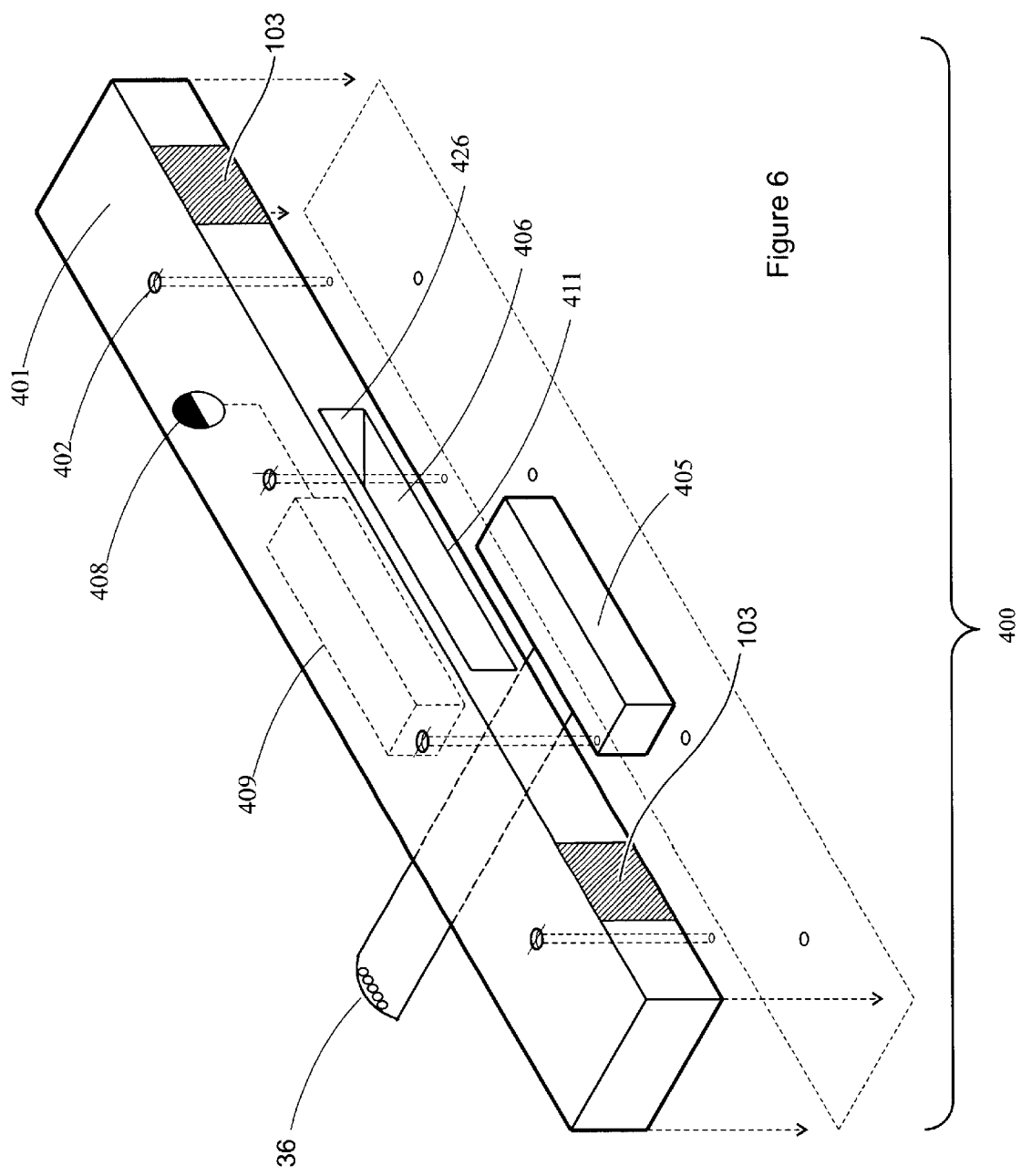
FIG. 6 is a perspective view of a wheel stop service port of the service terminal in FIGS. 1 to 5.

Referring to FIG. 6, the wheel stop service port 400 serves as a ground-mounted stationary docking location for vehicles 12 equipped with compatible connectivity devices 500. Such vehicles 12 couple to the wheel stop service port 400 and bi-directionally transfer services between the service terminal 14 and the vehicle 12. As mentioned, these services include electrical power, gaseous or liquid fuels, water, or data. The wheel stop service port 400 is also designed to prevent the wheels of the vehicle 12 from traveling beyond a specific point in a parking stall and to locate the vehicle 12 in a position that places the vehicle's connectivity device 500 in a position for coupling to the service port 400.

According to one embodiment of the invention, the wheel stop service port 400 has a generally elongate rectangular wheel stop housing 401 with fastening holes 402. The fastening holes receive a fastener (not shown) for fastening the service port 400 to a parking surface. Near the center of the front surface of the housing 401 is a recess opening 411 that opens into a receptacle recess 409. A connection bay 406 and a receptacle 600 are mounted inside the receptacle recess 409. The connection bay 406 has a front opening in the shape of a rectangular slot, and has walls 426 that taper inwards both vertically and horizontally into the receptacle 400. The front opening of the connection bay 406 is flush with the recess opening 411. The receptacle 600 is mounted inside the receptacle recess 409 behind the connection bay 406 and also has tapered walls 626 (shown in FIG. 16) that taper into the back wall of the receptacle 600. As discussed in detail below, the tapered walls 426, 626 serve to guide a service plug 700 from the vehicle's connectivity device 500 into a coupling position inside the receptacle 600, i.e. into a position where the plug 700 contacts the back wall of the receptacle 600.

In this description, the receptacle 600 and plug 700 are collectively referred to as a "service coupling". Furthermore, the connection bay 406 and receptacle 600 are collectively referred to as the "connection bay assembly".

The tapered walls 426, 626 act to guide, or "self locate" the plug 700 into a coupling position, thereby removing the need to provide costly electronic coupling guidance systems. It is understood that other self-locating designs such as a funnel may be substituted for the tapered walls 426, 626 as will occur to one skilled in the art.

The service port 400 is externally controlled by the service port controller 34 via a signal conduit housed inside the service conduit 36. An externally controlled receptacle 600 allows system intelligence such as the service port controller 34 to be located elsewhere enabling the service port 400 to serve as a "dumb terminal" that can be economically and easily replaced. Optionally, the service port 400 also has a port status indicator 408 located on the top surface of the housing 401. The indicator 408 is electrically communicative with the receptacle 600, or optionally with the port controller 34 to receive status control signals, e.g. a port failure status control signal.

The recess opening 411 is located on the front wall of the service port 400 but it may be located anywhere on the wheel stop housing 401. For example, the recess opening 411 may open from the top surface of the housing 401 such that the receptacle 600 and connection bay 406 receive a vertically deployed connectivity device 500.

The receptacle 600 is provided with service exchange interfaces that mate with corresponding service exchange interfaces on the plug 700, to effect a transfer of services therebetween. The service conduit 36 is coupled to the receptacle 600 at the back of the service port 400 and to service sources and/or destinations, thereby enabling the services to be transferred to and from the service port 14 and the service source/destination.

In an alternative embodiment, the service terminal 14 does not include the wheel stop service port 400 and in such case, a service port comprising the connection bay 406 and receptacle 600 are located elsewhere on the service terminal 14, and the corresponding location of the connectivity device 500 on the vehicle 12 of the alternative embodiment, is at a position for coupling to the service port 400.

Figure 7:
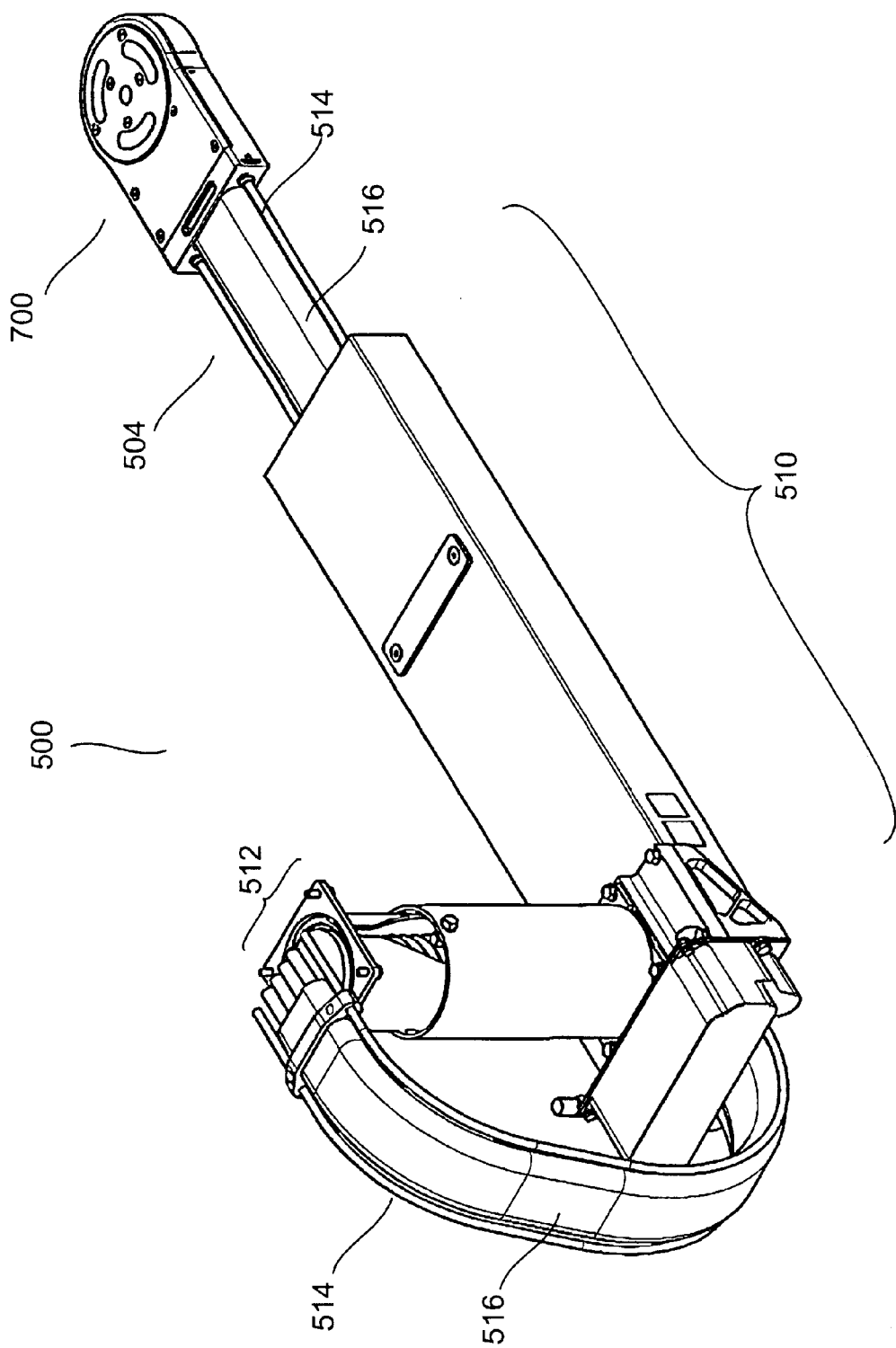
FIG. 7 is a perspective view of a connectivity device mountable to a vehicle.

Referring to FIG. 7, the connectivity device 500 is for connecting the vehicle 12 to the service terminal 14 such that services can be exchanged therebetween. In this first embodiment, the connectivity device 500 is mountable to the front, underside of the vehicle 12, has a motorized mechanism to deploy the connectivity device 500 from the vehicle 12, and has a plug 700 to couple to the receptacle 600 on the wheel stop service port 400 when the vehicle 12 is in close proximity to the wheel stop service port 400. However, it is within the scope of the invention to locate the connectivity device 500 on the wheel stop service port 400, and locate the receptacle 600 on the vehicle 12; in such case, the connectivity device 500 extends from the wheel stop service port 400 to couple to the vehicle 12 when the vehicle 12 is in close proximity to the wheel stop service port 400.

The major components of the connectivity device 500 are the plug 700 for coupling to the receptacle 600 of the service terminal 14, a compliant member 504 attached at one end to the plug 700, a deployment apparatus 510 attached to the compliant member 504 for deploying the plug 700 from a stored position into a deployed position and retracting same back into the stored position, and a vehicle mounting assembly 512 attached to the deployment apparatus 510 and couplable to the underside of the vehicle 12.

The compliant member 504 comprises a pair of flexible tubular fluid lines 514 and a flexible electrical cable 516 having a plurality of flexible electrical power conductors (not shown) housed within a protective jacket. The fluid lines 514 and the power conductors are coupled to components of the vehicle 12 that use or supply electricity and/or a fluid such as water. For example, the fluid lines 514 and electrical, cables may be connected to the on-board electrolyzer 46 to supply feedstock fluid and power the electrolyzer 46, respectively. In this embodimenit, the fluid lines 514 are used to transfer water, however, it is to be understood, that other fluids such as hydrogen can be transferred by the fluid lines 514.

The plug 700 is shown in detail in FIGS. 8 to 13. The plug 700 has a flattened rectangular box shape with its distal end resembling a half cylinder. The longitudinal and cylindrical edges of the plug 700 are beveled. As will be described in detail below, the cylindrical shape of the plug 700 is part of a design that enables the plug 700 to couple to the receptacle 600 at different angles and still enable the coupling to maintain a fluid and electrical connection. In this description, when the plug 700 is in a preferred orientation with the receptacle 600 it is referred to as being "perfectly aligned", and when the plug 700 is in another orientation that still maintains a fluid and electrical connection, it is referred to, as being "operably aligned".

The plug 700 has a pair of service engagement portions, namely, a generally circular planar fluid exchange interface 702 at the distal end of its bottom face, and a generally circular planar electricity exchange interface 704 at the distal end of its top face. The plug fluid exchange interface 702 interacts with a corresponding fluid exchange interface 602 (shown in FIG. 14) of the receptacle 600 to transmit fluids between the vehicle and the service terminal 14. Similarly, the plug electricity exchange interface 704 interacts with a corresponding electricity exchange interface 604 (shown in FIG. 14) of the receptacle 600 to transmit electricity between the vehicle and the service terminal 14. The fluid and electricity exchange interfaces 702, 704 are located on opposite faces of the plug 700 to provide maximum physical separation between the transmitted fluids and electricity. Furthermore, the fluid exchange interface 702 is located on the bottom face of the plug 700 to prevent any fluids from spilling onto the electricity exchange interface 704.

It is to be understood that "top", "bottom", "distal", "proximal" and other directional indicators are used in this specification as convenient reference terms and correspond with the orientation of the described components in their normal operation; however, such reference terms are not to be construed as limiting the orientation of the described components to any particular orientation.

Figure 8:
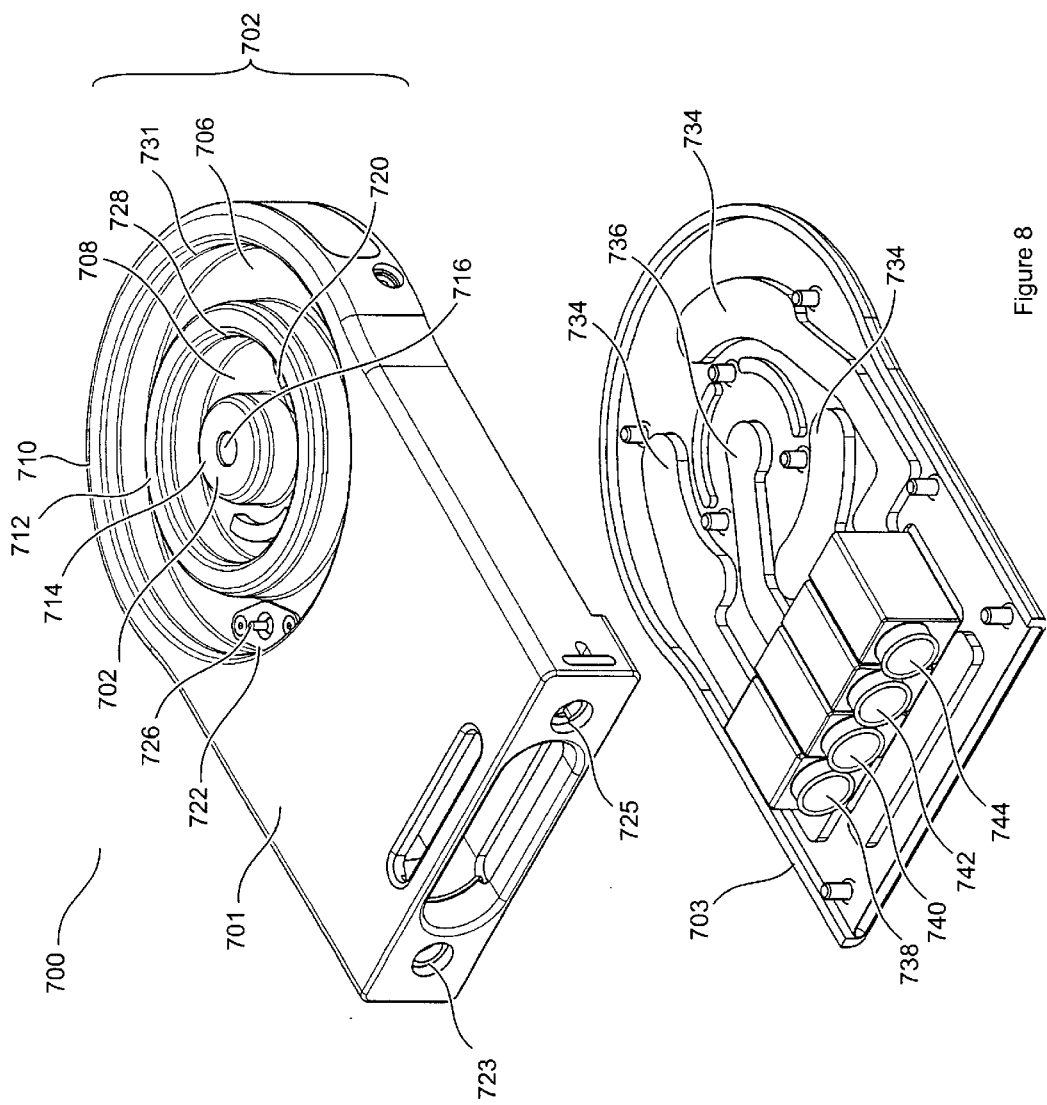
FIG. 8 is a perspective exploded view of a plug of the connectivity device.
Figures 9, 10:
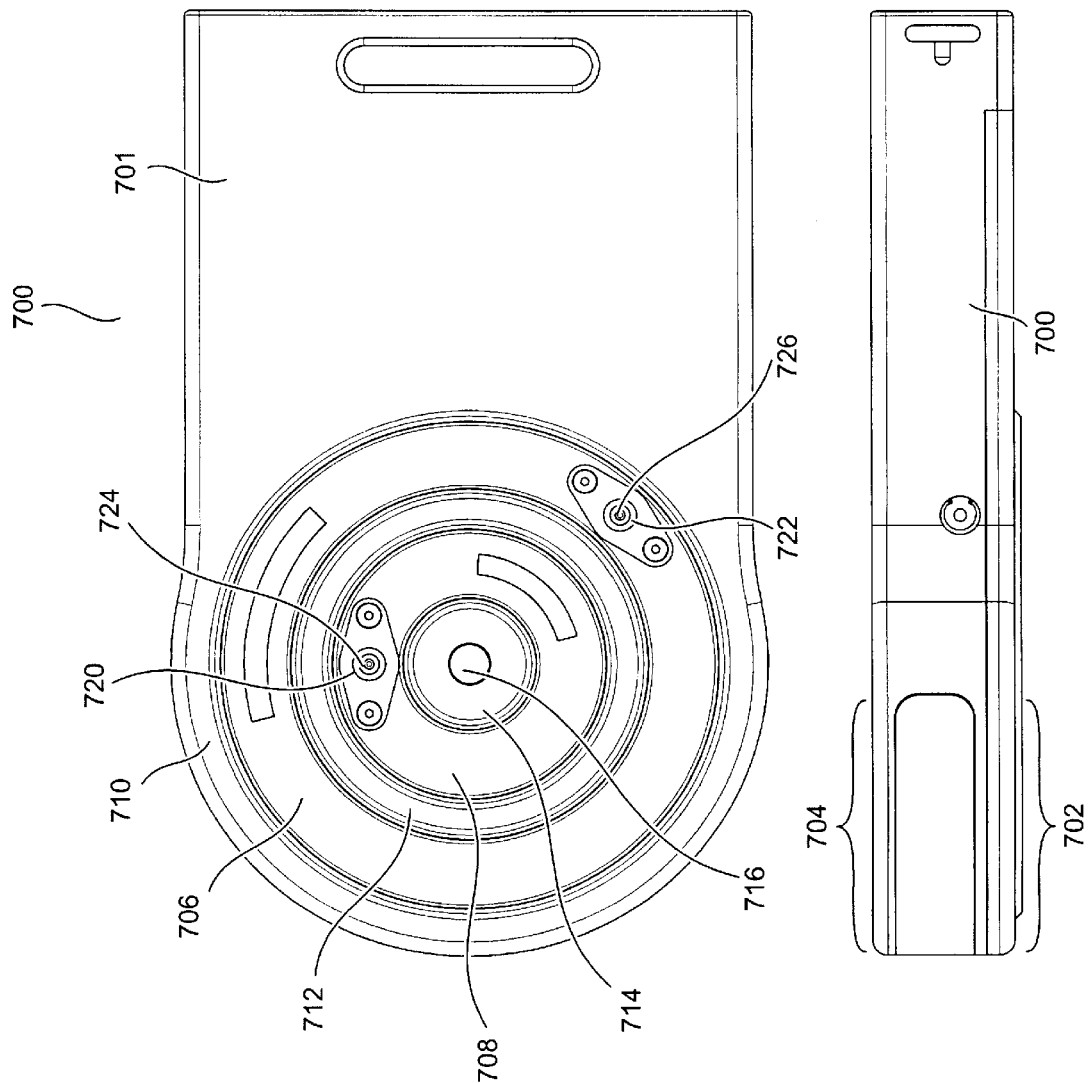
FIG. 9 is a bottom plan view of the plug showing the plug fluid exchange interface.
FIG. 10 is a side elevation view of the plug.

Referring particularly to FIG. 8, the plug 700 has a shell comprising of two pieces of molded diallyl phthalate plastic namely, a fluid exchange interface shell 701 and an electricity exchange interface shell 703. Alternatively, instead of diallyl phthalate plastic, the shell can be made of another type of thermoplastic or thermoset material such as polyetheretherketone. Referring particularly to FIGS. 8 to 10, the fluid exchange interface shell 701 is molded with outer and inner concentric annular open-faced fluid supply and drain channels 706, 708 and therebetween, outer, middle and inner concentric annular lands 710, 712, and 714, all centered around the center point of the fluid exchange interface 702 (which is the axis of the concentric channels and lands 706, 708, 710, 712, 714. The lands 710, 712, 714 are beveled to guide the plug 700 into alignment with the receptacle 600 when the plug 700 engages the receptacle 600 at an angle relative to the horizontal.

Located on the floor of the plug, fluid drain channel 708 is a fluid drain port 720, and on the floor of the plug fluid supply channel 706 is a fluid supply port 722. The fluid drain port 720 is fluidly coupled to the fluid lines 514 of the connectivity device 500 via fluid drain lines 723 in the plug 700. The fluid supply port 722 is fluidly coupled to the fluid lines 514 via fluid supply lines 725 in the plug 700. The fluid drain and supply ports 720, 722 are biased closed by respective spring-loaded/poppet valve assemblies 724, 726. When the plug 700 is not coupled to the receptacle 600, the valves 724, 726 are in their extended position, thereby completing a seal; when plug 700 is coupled to the receptacle 600, the springs are compressed, thereby opening a passage for fluid to flow through the valves 724, 726. Most of the valve assembly of both valves 724, 726 are recessed in the surface of the fluid drain channel floor to reduce the likelihood of contaminants contacting the valves' external surfaces. Rubber O-rings 728, 731 are attached to the channel walls of the inner and outer fluid channels 708, 706 to provide a fluid seal when the fluid drain and supply ports 720, 722 engage corresponding fluid supply and drain ports of the receptacle 600.

Optionally, the plug fluid exchange interface 702 transfers hydrogen and includes a hydrogen transfer port 716 located on the surface of the inner land 714, and a hydrogen transfer conduit (not shown) connecting the hydrogen transfer port. 716 to certain components in the vehicle 12, e.g. a hydrogen storage tank. The hydrogen transfer port 716 is provided with a valve assembly (not shown).

Figures 11, 12:
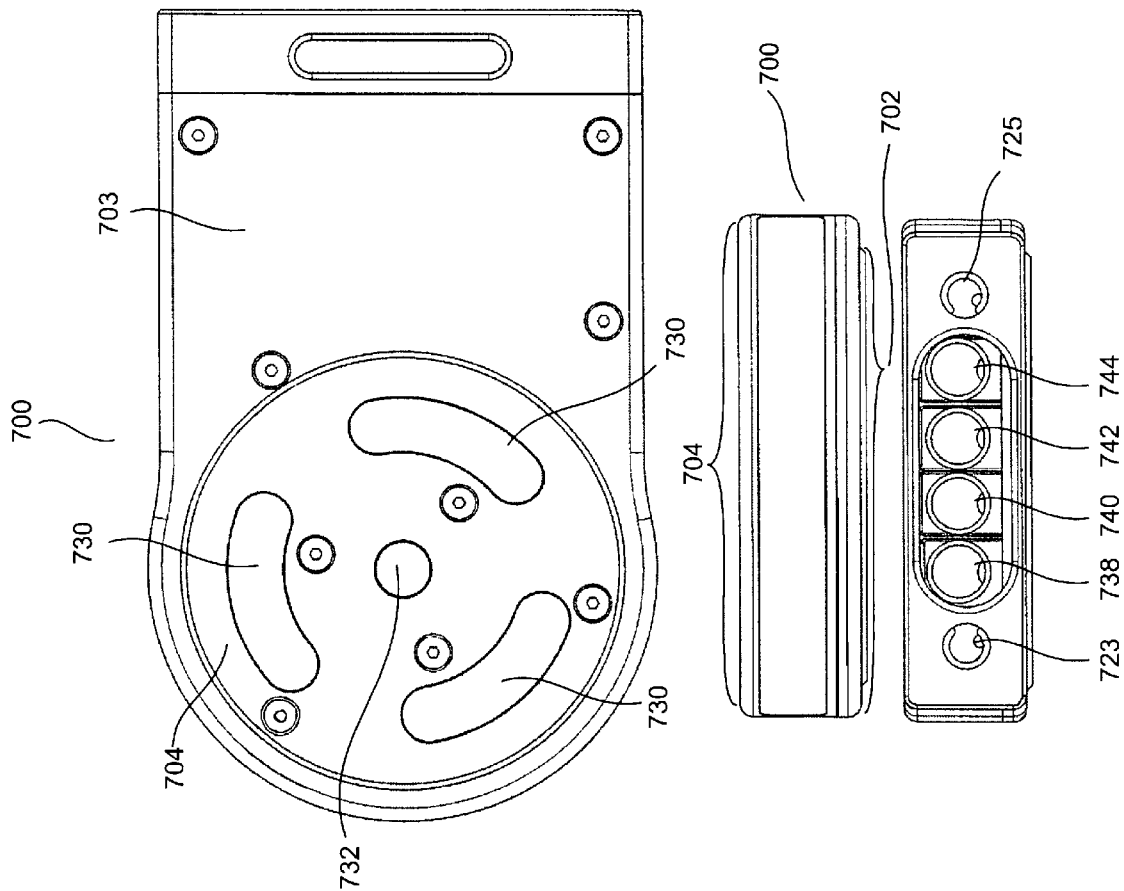
FIG. 11 is a top plan view of the plug showing the plug electricity exchange interface.
FIG. 12 is a distal end elevation view of the plug.

Referring to FIGS. 8 and 11, the electricity exchange interface shell 703 is molded to provide three open-faced electrical bus bar contacts 734 and an open-faced ground bus bar contact channel 736. The electrical bus bar contacts 734 extend between arcuate openings in the electricity exchange interface 704 to electrical contact ports 738, 742, 744 at the proximal end of the plug 700. The arcuate openings resemble three segments of a circular arc contact centered about the electricity exchange interface 704, wherein each segment has an arc length of about 90 degrees, and is separated from each other by about 30 degrees. The ground bus bar contact 736 extends from a circular opening in the center of the electricity exchange interface 704 to ground contact port 740 at the proximal end of the plug 700. Seated in the electrical bus bar contacts 734 are electrical contacts 730 that have an arcuate engagement portion that extends into the arcuate openings and an end portion that extends into the electrical contact ports 738, 742, 744. These electrical contact ports 738, 742, 744 in turn are connected to electrical cables in the connectivity device 500 which are connected to electrical components on the vehicle 12. Electricity is transmittable between the vehicle. 12 and service terminal 14 when the plug 700 is plugged into the receptacle 600 and the electrical contacts 730 contact corresponding electrical contacts 630 of the receptacle 600. Each contact 730 transmits current of a different phase, such that collectively, the contacts 730 enable the transmission of three-phase AC current. A ground contact 732 is seated in the ground bus bar contact 736 and extends into the circular opening, as well as to ground contact port 740; the ground bus bar contact 736 contacts a corresponding receptacle ground contact 632 when the plug 700 is plugged into the receptacle 600.

When the plug 700 is perfectly aligned with the receptacle 600, the receptacle electrical contacts 630 (which are butt-type contacts) contact the mid-point of the plug electrical contacts 730; the 90 degree arcuate nature of the contacts 730 enables the plug 700 to have an operable alignment of +/−45 degrees, i.e. maintain a service connection even when the plug 700 is aligned +/−45 degrees from the perfect alignment.

Alternatively, the three contacts 730 can be replaced by a single contact if only one-phase power is desired; in such case, the contact can be a single annular ring. Similarly, the circular fluid channels may instead be one or more arcuate channels centered about the fluid exchange interface 602 center point.

According to another alternative embodiment of the invention, the arcuate contacts may be arranged concentrically around a common arc-axis (not shown). One or a group of contacts has a common radius, and the electrical exchange interface may have a plurality of such groups, each having a different radius.

Referring to FIGS. 14 to 17, the major components of the receptacle 600 are a service engagement portion comprising the fluid exchange interface 602 and the electricity exchange interface 604, a protective cover assembly 646, a plug clamping assembly 607, and a cover drive assembly 609.

Figure 16:
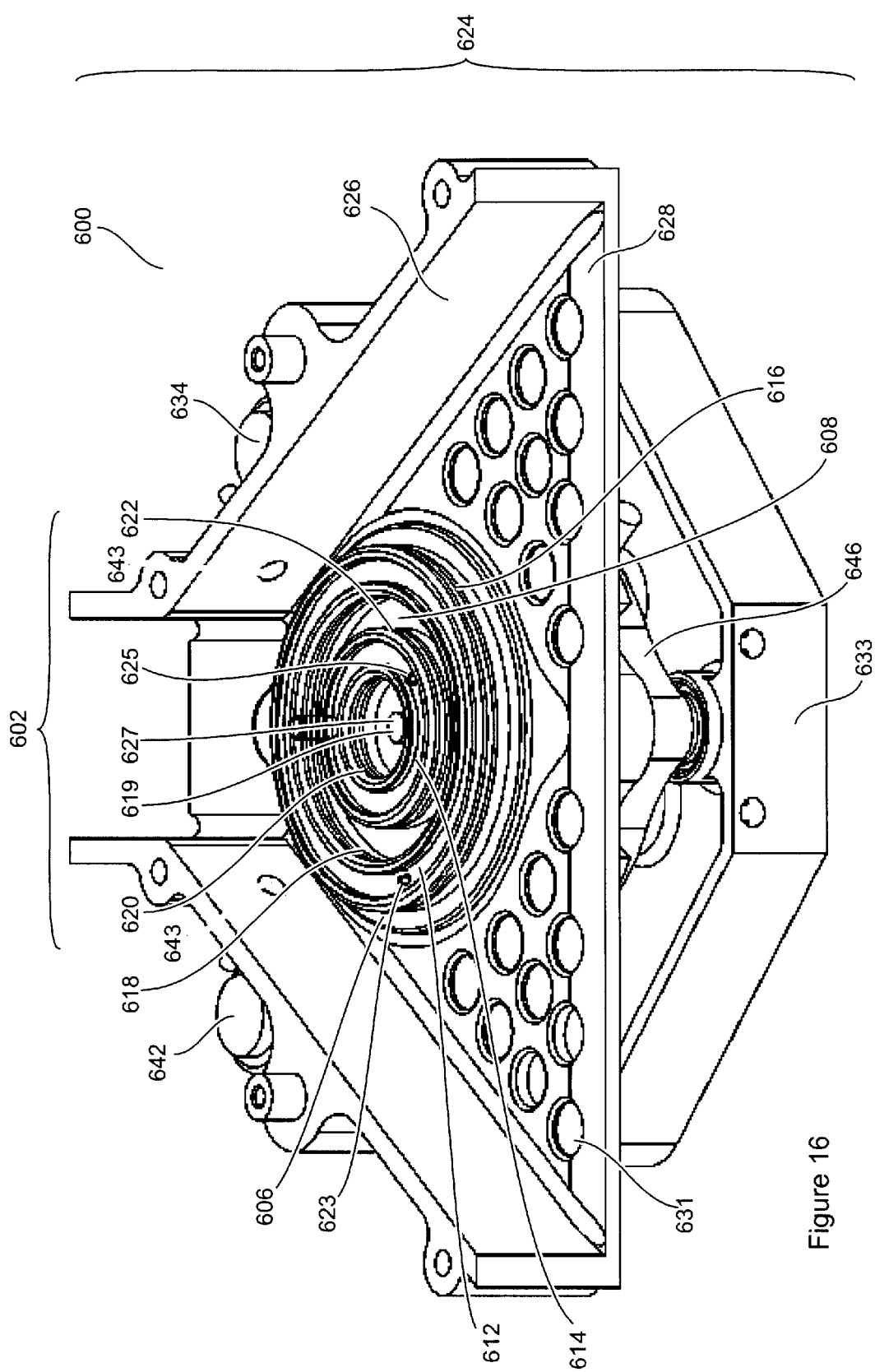
FIG. 16 is a perspective view of a lower assembly of the receptacle.
Figure 17:
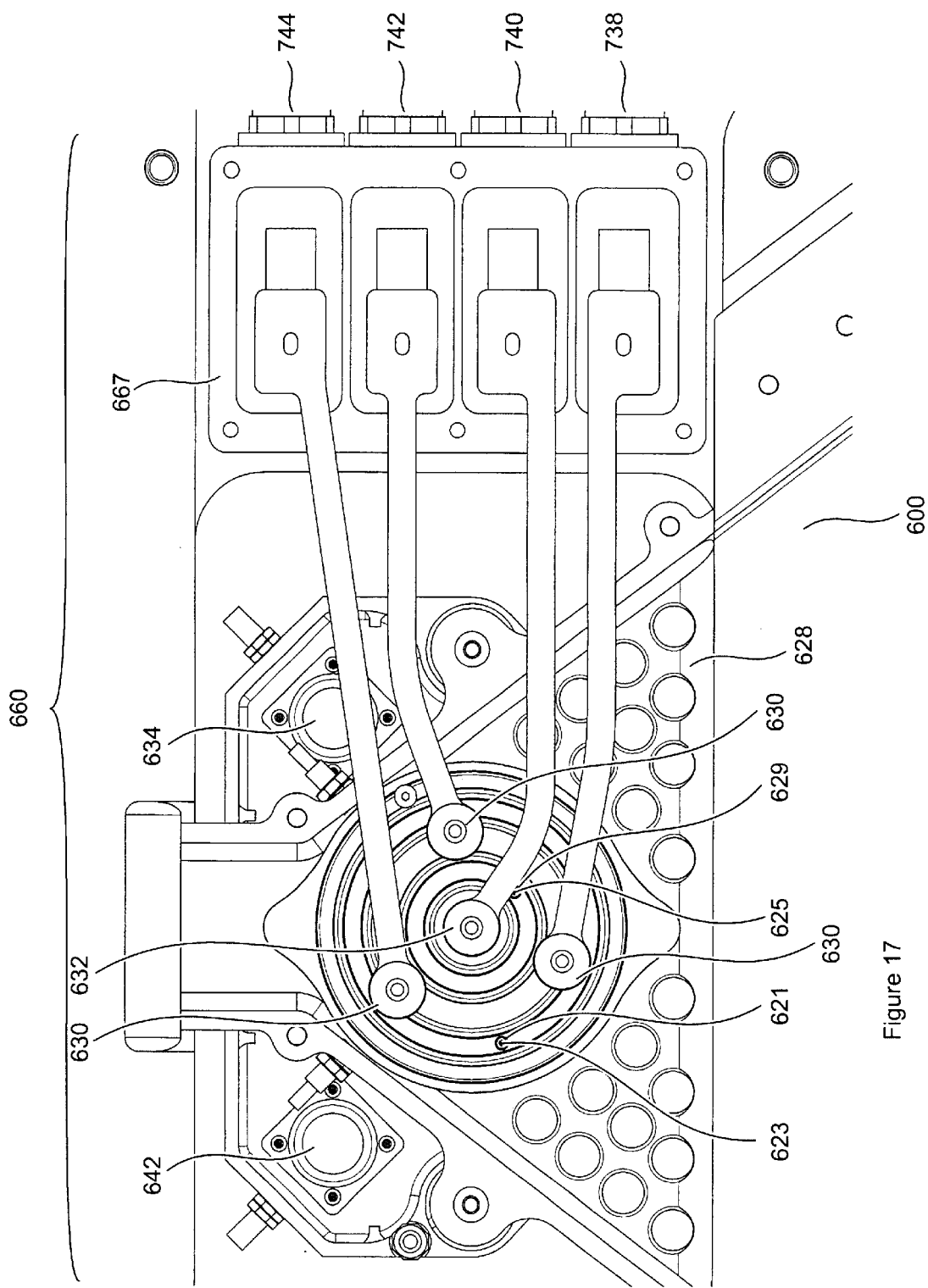
FIG. 17 is a top plan view of portions of the receptacle, including the electrical exchange interface.

Referring particularly to FIGS. 16 and 17, the receptacle fluid exchange interface 602 has a topography that corresponds to the topography of the plug fluid exchange interface 702. That is, the receptacle fluid exchange interface 602 has receptacle fluid supply and drain lands 612, 614 that mate with respective plug fluid supply and drain channels 706, 708, and receptacle channels 606, 608 that mate with plug lands 710, 712, 714 of the plug 700. The receptacle fluid supply land 612 is provided with inner and outer O-rings 616, 618 and receptacle fluid drain land 614 is provided with inner and outer O-rings 620, 622 to provide a fluid seal when the plug fluid exchange interface 702 and the receptacle fluid exchange interface 602 are engaged. The receptacle fluid supply land 612 has a fluid supply port 623 biased closed by a poppet valve assembly (not shown), and the receptacle fluid drain land 614 has a fluid drain port 625 also biased closed by a poppet valve assembly (not shown). A hydrogen cavity 627 is provided at the inner center portion of the receptacle fluid interface 602 with a hydrogen exchange port 619 biased closed by a poppet valve assembly (not shown).

The receptacle fluid exchange interface 602 is part of a larger receptacle lower assembly 624. The lower assembly 624 also includes tapered walls 626, and a dimpled floor 628. The tapering of the walls 626 guide the plug 700 into place, i.e. so that the plug fluid and electricity exchange interfaces 702, 704 overlap with the receptacle fluid and electricity exchange interfaces 602, 604. Dimples 631 in the floor 628 reduce friction and collect unwanted foreign matter. Underneath the floor 628 is a receptacle drive case 633 that holds plug clamping assembly 607 and the cover drive assembly 609.

The plug clamping assembly 607 includes a clamp actuation motor 634, a drive belt 636 connected to the motor 634, a sprocket assembly 638 connected to the drive belt 636, and at least one clamp activation screw 640 connected to the sprocket assembly 638. The receptacle fluid exchange interface 602 is vertically movably mounted to the receptacle lower assembly 624, and is vertically movable by the clamp activation screw(s) 640 connected to the bottom of the fluid exchange interface 602. A plurality of proximity sensors 641 is provided to detect the position of the receptacle fluid exchange interface 602, and in particular, when the receptacle fluid exchange interface 602 has contacted the plug fluid exchange interface 702. Such sensors 641 are conventional, and may be for example, an Omron 8 mm barrel inductive proximity sensor (OMRON E2F-X1 R5E1). One or more proximity sensors 643 or contact switches may be installed at the back of the receptacle 600 to detect when the plug 700 has been inserted in the receptacle 600 and is in place for coupling ("plug docked proximity" sensors) and may be for example, a barrel inductive proximity sensor. The clamping force may be monitored by using a clamping force proximity sensor (not shown) such as a barrel inductive proximity sensor. The operation of the motor may also be monitored by a receptacle motor current sensor (not shown) such as a CUI Stack Inc., SCD5PSR.

Alternatively, the plug clamping assembly 607 may be magnetically driven. In such case, the plug clamping assembly comprises a solenoid assembly (not shown) that actuates a receptacle fluid exchange interface 602 that is movably mounted to the receptacle lower assembly 624.

Figure 14:
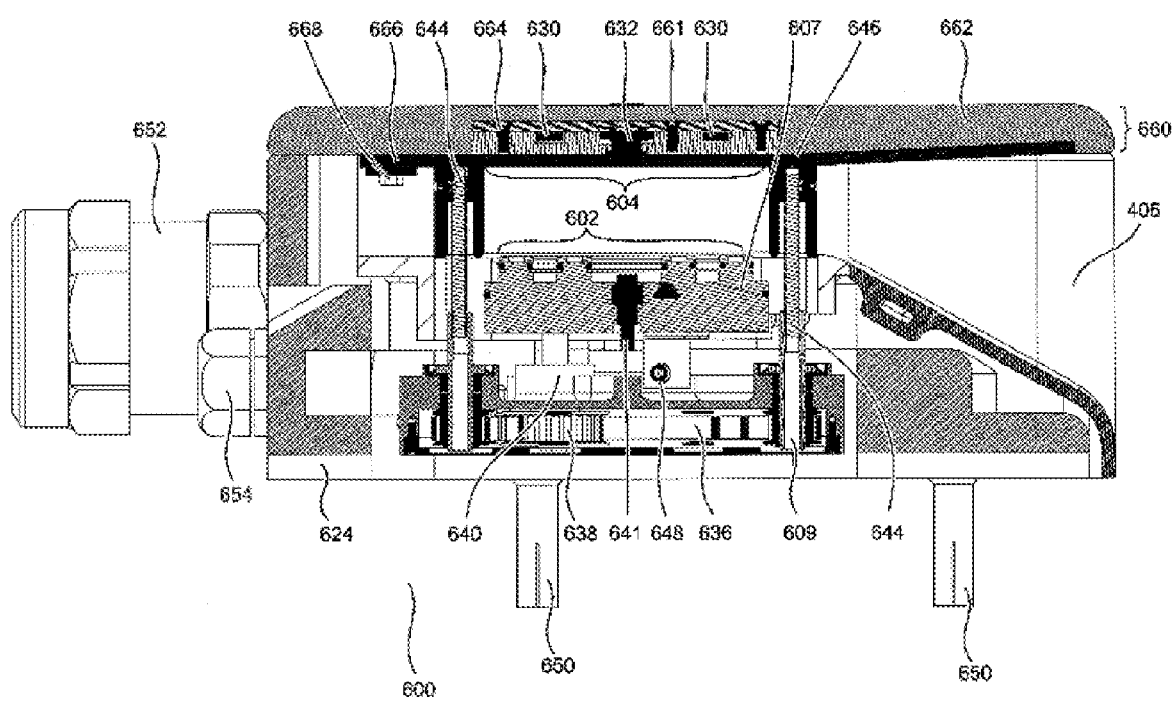
FIG. 14 is a side elevation view of the wheel stop service port in an uncoupled, state.
Figure 15:
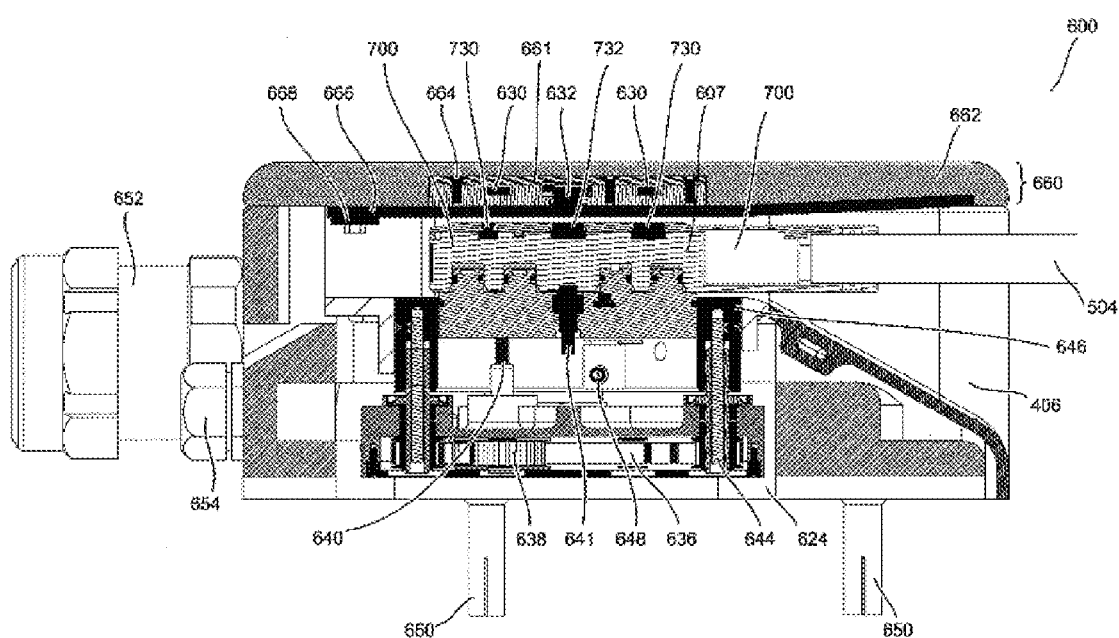
FIG. 15 is a side elevation view of the wheel stop service port coupled with the connectivity device.

Referring particularly to FIGS. 14 to 16 the cover drive assembly 609 includes a cover actuation motor 642, a drive belt (not shown) connected to the motor 642, a cover sprocket assembly (not shown) connected to the belt, and a cover activation screw 644 connected to the sprocket assembly. The cover activation screw 644 is connected to an annular cover 646 that surrounds the outer periphery of the receptacle fluid exchange interface 602. The cover 646 is vertically movably mounted to the lower assembly 624; as can be seen in FIGS. 14 and 15, the motor 642 can be activated to raise and lower the cover 646. The cover 646 is raised when the receptacle 600 is empty, and lowered to allow the plug 700 to enter into the receptacle 600. A plurality of proximity sensors 648 are provided to detect when the cover is fully raised or fully retracted, respectively. Such sensors 648 are conventional and may be for example an Omron E2FXR5E1 for the cover down proximity sensor, a Micronas HAL300 for the cover pulse counter sensor, and a CUI Stack Inc., SCD5PSR for the cover motor current sensor.

The service port 400 is provided with wheel stop housing anchor nuts 650 that attach the service port 400 to a parking surface, an AC power cable junction 652 extending out of the back of the service port 400 and housing AC power connectors, (not shown), a DC signal junction 654 also extending out of the back of the service port 400 and housing a DC signal connectors, and a fluid conduit junction 655 extending out of the back of the service port 400 and housing water and hydrogen gas conduit connectors (not shown).

The respective connectors are coupled to the receptacle 600, to enable the flow of electricity and fluids therebetween.

Referring particularly to FIGS. 15 and 17, the receptacle electricity exchange interface 604 has a circular shape that corresponds to the plug electricity exchange interface 704. The surface of the electricity exchange interface 604 has three contact openings (not shown) equidistant from the center of the electricity exchange interface 604 and a ground opening (not shown) at the center of the electricity exchange interface 604. Each electrical contact 630 is a butt-type contact having an engagement end that extends through each contact opening, and is also coupled to electrical connectors (not shown) in the wheel stop service port 400 that in turn are coupled to an external electrical source and/or user, e.g. an electrical grid. The engagement end has a diameter that does not exceed the width of the arcuate electrical contacts 730 of the plug 700; this enables electrical contact to be maintained between the plug and receptacle contacts 730, 630 when the plug 700 is rotated about the axis of the arcuate plug contacts 730 and within the arc-length of the plug contacts 730. Similarly, a ground contact 632 has a butt engagement end that extends through the ground opening (not shown) and a body that is coupled to a grounded electrical connector (not shown). The electrical and ground contacts 630, 632 are sprung by a disk spring (not shown) that biases the contacts 630, 632 through the openings to enhance the contact between the receptacle contacts 630, 632 and the plug contacts 730, 732 when the plug 700 is plugged into the receptacle 600. Alternatively, the spring may be a conical washer or Belleville washer. The receptacle electrical and ground contacts 630, 632 may be made from a long strip of copper bus bar that is free to move in the upper receptacle assembly 260 to provide sufficient flexibility to allow the receptacle contacts 630, 632 to move upon contact with the plug contacts 730, 732 (shown in FIG. 11).

Referring again to FIGS. 14 and 15, the receptacle upper assembly 660 includes a receptacle upper assembly frame 661, the receptacle electricity exchange interface 604 attached to the bottom face of the frame 661 by mounting screws 664, an elastomeric contact seal 666 mounted to the frame 661 by mounting bolts 668, electrical junction box 667 (shown in FIG. 17) physically attached to the frame 661 and electrically connected to the electrical contacts 630, 632, and means to attach the frame 661 to the lower assembly 624, e.g. screws. The upper assembly 660 is covered by a top panel 662 of the housing 401. The elastomeric seal 666 is biased downwards and provides protection to the electrical and ground contacts 630, 632 when the receptacle is uncoupled. The junction box 667 is also provided with electrical contact ports 738, 742, 744 that connect the electrical contacts 630 to the service conduit 36, and with ground contact port 740 that connects the ground contact 632 to the service conduit 36. The elastomer seal 666 may have a dimpled exterior surface pattern; under compression, this surface pattern may cause environmental water and other liquids to displace into the dimples, thereby increasing the electrical resistance between the contacts.

A coupling between the plug 700 and receptacle 600 is established as follows: The vehicle 12 is driven into a service port docking position and parked such that the front wheels of the vehicle 12 make contact with the wheel stop housing 401. Markings may be provided on the a wheel stop contact surface 103 of the housing 401 or elsewhere on the service terminal 14 to provide a visual guide for the driver to park the vehicle 12 so that the connectivity device 500 is aligned with the receptacle 600. The wheel contact surface 103 is located on the housing surface such that the aligning of the wheels with the wheel contact portion aligns the connectivity device 500 with the recess opening 411.

When no vehicle 12 is docked with the wheel stop service port 400, the fluid exchange interface 602 is in a lowered position, and the protective cover 646 is in a raised position. When raised, the protective cover 646 keeps foreign matter away from the components inside the receptacle 600. When the service port controller 34 detects that the vehicle 12 has maneuvered into docking position and is ready to dock with the service terminal 14, and the vehicle user has been approved for exchanging services with the service terminal, the controller 34 activates the cover actuation motor 642, which lowers the protective cover 646.

Then, the connectivity device 500 is deployed from the vehicle 12 towards the opening in the connection bay 406. The connectivity device 500 is extended until the plug 700 enters the receptacle 600 and contacts the back of the receptacle 600. When the receptacle proximity sensor 643 detects that the plug 700 has been inserted, the clamp actuation motor 634 is activated, and the receptacle fluid exchange interface 602 is raised until contact is established between the plug fluid exchange interface 702 and the receptacle fluid exchange interface 602; at this point the plug's O-rings 728, 731 are partially seated on the receptacle fluid exchange interface lands 612, 614 and a fluid seal is established. The receptacle fluid exchange interface 602 continues to rise until the plug electricity exchange interface 704 is brought into contact with the receptacle electricity exchange interface 604 and the elastomeric seal 666 of the receptacle electricity exchange interface 604 is compressed thereby exposing the receptacle electrical and ground contacts 630, 632, and the plug electrical and ground contacts 730, 732 engage. The proximity sensor 641 detects when the plug and receptacle interfaces 730, 732, 630, 632 are fully engaged, and directs the clamp actuation motor 634 to stop. The clamping force exerted should be sufficient to enable the transfer of fluids at a working pressure of about 12,000 psig, and a potential pressure up to 40,000 psig.

When fully engaged, the fluid supply and drain valves 726, 724 on the plug 700 contact the receptacle lands 612, 614, which cause the plug fluid supply and drain valves 726, 724 to deflect, and the plug fluid supply and drain ports 722, 720 to open. Similarly, upon engagement, the receptacle fluid supply and drain valves 621, 629 contact the respective floors of the plug fluid supply and drain channels 706, 708, which cause the receptacle fluid supply and drain valves 621, 629 to deflect and the receptacle fluid supply and drain ports 623, 625 to open. Alternatively, each valve assembly in the receptacle 600 may include a solenoid (not shown) electrically connected to and controlled by the service port controller 34 to open and close the valves. Supply fluid flows from the wheel stop service port 400 to the connectivity device 500 via respective fluid supply ports 623, 722, and drain fluid drains from the vehicle 12 to the connectivity device 500 via respective fluid drain ports 625, 720. Also, full engagement causes the plug inner land 714 to mate with the receptacle hydrogen cavity 627, and valves in each of the plug and receptacle hydrogen ports 716, 619 to deflect, thereby enabling the transfer of hydrogen between the vehicle 12 and connectivity device 500.

Also, when the plug 700 is fully engaged in the receptacle 600, electrical contact between the arc-shaped plug contacts 730 and the receptacle butt-type electrical contacts 630 are established, and electricity can be bi-directionally transferred between the wheel stop service port 400 and the connectivity device 500.

Figure 18:
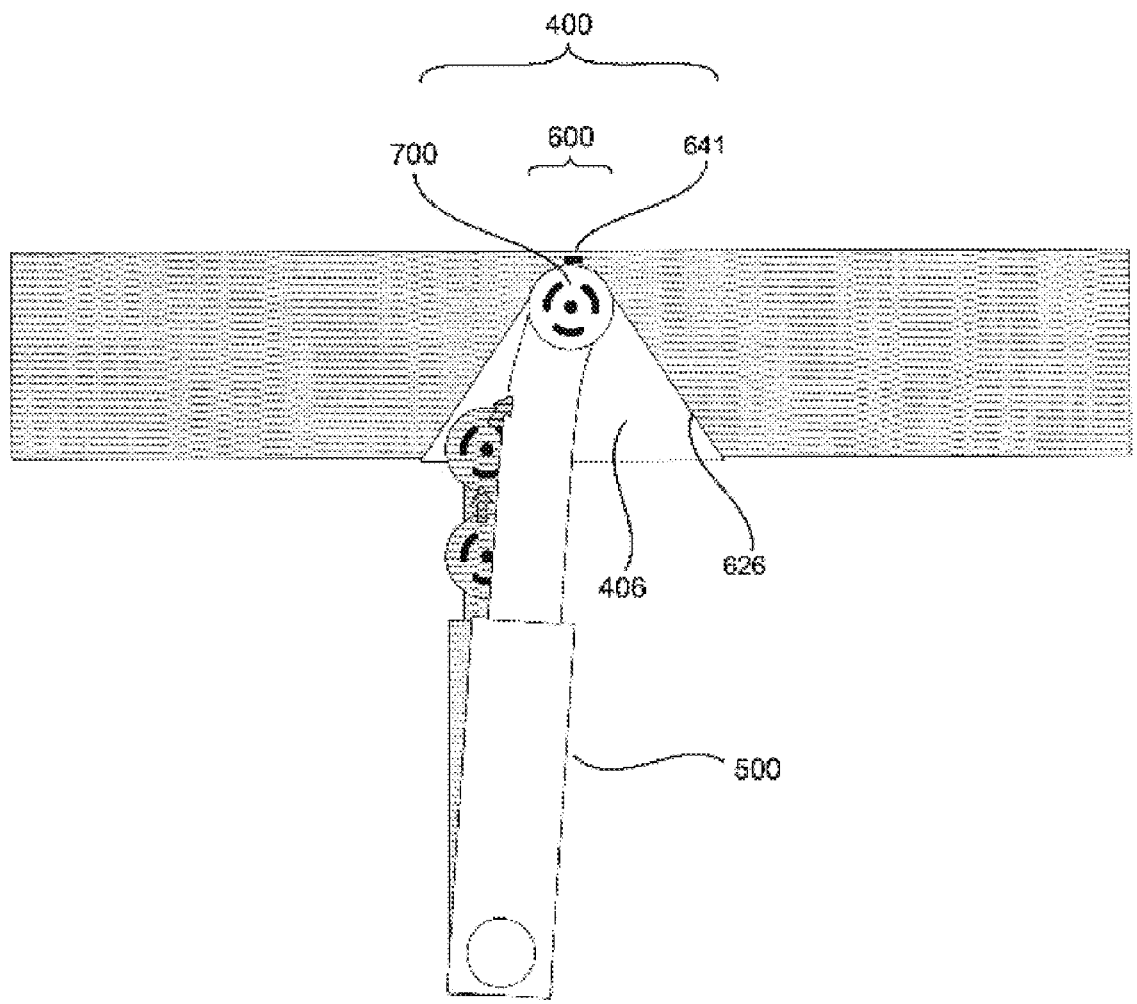
FIG. 18 is a schematic plan view of a misaligned connectivity device engaging the receptacle.

Referring to FIG. 18, when the vehicle 12 and connectivity device 500 are perfectly aligned with the wheel stop service port 400, the connectivity device 500 passes through the middle of the connection bay opening without contacting the tapered walls 426, 626, and the plug 700 enters directly into the receptacle 600. However, when the connectivity device 500 is not perfectly aligned but still within range of the connection bay 406, a service connection may still be established where: (1) means are provided to actively move the connectivity device 500 into alignment ("active docking means"), or where active docking means are not provided, (2) the plug 700 is designed so that its arcuate service engagement portions maintain engagement with the receptacle engagement portions when the plug 700 is rotated about the axis and within the arc-length of the arcuate engagement portion.

The connectivity device 500 is within range of the connection bay 406 when the connectivity device 500 can be deployed from the parked vehicle 12 such that the plug 700 can be extended through the connection bay opening and guided into the receptacle 600. As noted above, the connectivity device 500 is perfectly aligned when the plug 700 can be inserted directly into the receptacle 600 without contacting any of the walls of the connection bay 406. When the connectivity device 500 is not perfectly aligned but still within range of the connection bay 406, the deployment of the plug 700 causes the plug 700 to first encounter one of the tapered walls 426, 626 of the connection bay 406 or the receptacle 600. Upon further deployment, the compliance of the connectivity device 500 enables the connectivity device 500 to flex so that the plug 502 is guided into the receptacle 600. Deployment of the connectivity device 500 continues until the plug 502 is fully inserted inside the receptacle 600 (i.e. contacts the back wall of the receptacle 600). It can be seen from FIG. 18 that when the connectivity device 500 is not perfectly aligned, the plug 700 is inserted into the receptacle 600 at an angle. The arcuate electrical contacts 730 and the annular fluid channels of the plug 700 enable services to be transferred between the plug 700 and the receptacle 600 even when not perfectly aligned.

Optionally, one of the tapered walls 426, 626 or plug 700 may have a low friction coating which enhances the sliding of the plug 700, particularly after repeated use.

While the preferred embodiment of the invention has been illustrated and described, it will be appreciated that various changes can be made therein without departing from the scope and spirit of the invention.

What is claimed is:

1. A service coupling for coupling a vehicle to a service port such that one or more services are transferable therebetween, the service coupling comprising:

(a) a plug comprising a distal end, a proximal end, a pair of opposed major surfaces extending between the distal and proximal ends, and a service engagement portion on at least one of the major surfaces; and (b) a receptacle comprising an opening shaped to receive the plug inserted distal-end first, and a service engagement portion inside the receptacle and corresponding with each plug service engagement portion;

wherein one of the plug and receptacle service engagement portions is substantially arcuate and the other engagement portion is configured to engage at least some portion of the arcuate engagement portion along the arc-length of the arcuate engagement portion, thereby enabling engagement to be maintained between the plug and receptacle engagement portions when the plug is in a rotational position about the arc-axis of the arcuate engagement portion and that is not perfectly aligned with the receptacle.

2. The coupling of claim 1 wherein at least one of the plug service engagement portion and at least one of the receptacle service engagement portion are electricity exchange interfaces comprising electrical and ground contacts.

3. The coupling of claim 2 wherein the plug electrical contact is substantially arcuate.

4. The coupling of claim 3 wherein the plug comprises a plurality of arcuate electrical contacts all having a common arc-axis.

5. The coupling of claim 4 wherein the ground contact is located on the arc-axis.

6. The coupling of claim 5 wherein a receptacle electrical contact is provided for each plug contact, and the receptacle electrical contacts are butt-face contacts positioned to engage a corresponding plug contact when the plug and receptacle are coupled.

7. The coupling of claim 1 wherein the plug and receptacle service engagement portions are fluid exchange interfaces and one of the fluid exchange interfaces comprises an open-faced arcuate fluid channel and a fluid valve in the channel.

8. The coupling of claim 7 wherein the plug fluid exchange interface is an arcuate fluid channel with a fluid valve set in the floor of the channel.

9. The coupling of claim 8 wherein the receptacle fluid exchange interface is an arcuate land corresponding to the plug fluid channel, with a fluid valve set in the raised surface portion of the land.

10. The coupling of claim 8 wherein the plug fluid channel is annular.

11. The coupling of claim 10 wherein the receptacle fluid exchange interface is an annular land corresponding to the plug fluid channel, with a fluid valve set in the raised surface portion of the land.

12. The coupling of claim 11 wherein the plug further includes an electricity exchange interface on the major surface opposite the fluid exchange interface and comprising electrical and ground contacts.

13. The coupling of claim 12 wherein the plug electricity exchange interface is on the plug top major surface and the plug fluid exchange interface is on the plug bottom major surface.

14. The coupling of claim 7 wherein the exchange fluid is water.

15. The coupling of claim 7 wherein the exchange fluid is hydrogen gas.

16. The coupling of claim 7 wherein the plug has a pair of opposed top and bottom major surfaces extending between distal and proximal ends of the plug, and the fluid exchange interface is on one major surface.

17. A service coupling for coupling a vehicle to a service port such that one or more services are transferable therebetween, the service coupling comprising:

a receptacle comprising an opening shaped to receive a plug inserted distal-end first, and at least one service engagement portion inside the receptacle for engaging a corresponding service engagement portion on the plug; and wherein at least one of the receptacle service engagement portions is substantially arcuate such that the plug service engagement portion can engage at least some portion along the arc-length of the arcuate receptacle service engagement portion when the plug is in a rotational position about the arc-axis of the arcuate receptacle service engagement portion and that is not perfectly aligned with the receptacle; and wherein at least one of the plug service engagement portions is substantially arcuate such that the receptacle service engagement portion can engage at least some portion along the arc-length of the arcuate plug service engagement portion when the plug is in a rotational position about the arc-axis of the arcuate plug service engagement portion and that is not perfectly aligned with the receptacle.

18. The coupling of claim 17 wherein the receptacle service engagement portion is a fluid exchange interface.

19. The coupling of claim 18 wherein the receptacle fluid exchange interface is an arcuate land corresponding to an arcuate channel on the plug, with a fluid valve set in the raised surface portion of the land.

20. The coupling of claim 19 wherein the receptacle fluid exchange interface is an annular land corresponding to an annular channel on the plug, with a fluid valve set in the raised surface portion of the land.

21. The coupling of claim 18 wherein the exchange fluid is water.

22. The coupling of claim 18 wherein the exchange fluid is hydrogen gas.

23. A service coupling for coupling a vehicle to a service port such that one or more services are transferable therebetween, the coupling comprising:

(a) a plug comprising a distal end, a proximal end, a pair of opposed major surfaces extending between the distal and proximal ends, and a service engagement portion on at least one of the major surfaces, for engaging a corresponding service engagement portion in a receptacle; and wherein at least one of the plug service engagement portions is substantially arcuate such that the receptacle service engagement portion can engage at least some portion along the arc-length of the arcuate plug service engagement portion when the plug is in a rotational position about the arc-axis of the arcuate plug service engagement portion and that is not perfectly aligned with the receptacle.

24. The coupling of claim 23 wherein the plug service engagement portion is an electricity exchange interface comprising electrical and ground contacts.

25. The coupling of claim 24 wherein the plug electrical contact is substantially arcuate.

26. The coupling of claim 25 wherein the plug comprises a plurality of arcuate electrical contacts all having a common arc-axis.

27. The coupling of claim 26 wherein the ground contact is located on the arc-axis.

28. The coupling of claim 23 wherein the plug service, engagement portion is a fluid exchange interface comprising an open-faced arcuate fluid channel and a fluid valve set in the floor of the channel.

29. The coupling of claim 28 wherein the plug fluid channel is annular.

30. The coupling of claim 29 wherein the exchange fluid is water.

31. The coupling of claim 29 wherein the exchange fluid is hydrogen gas.

* * * * *